James. R. Brown's Improved Bolt Cutter.
No. 120,149.  Patented Oct. 24, 1871.
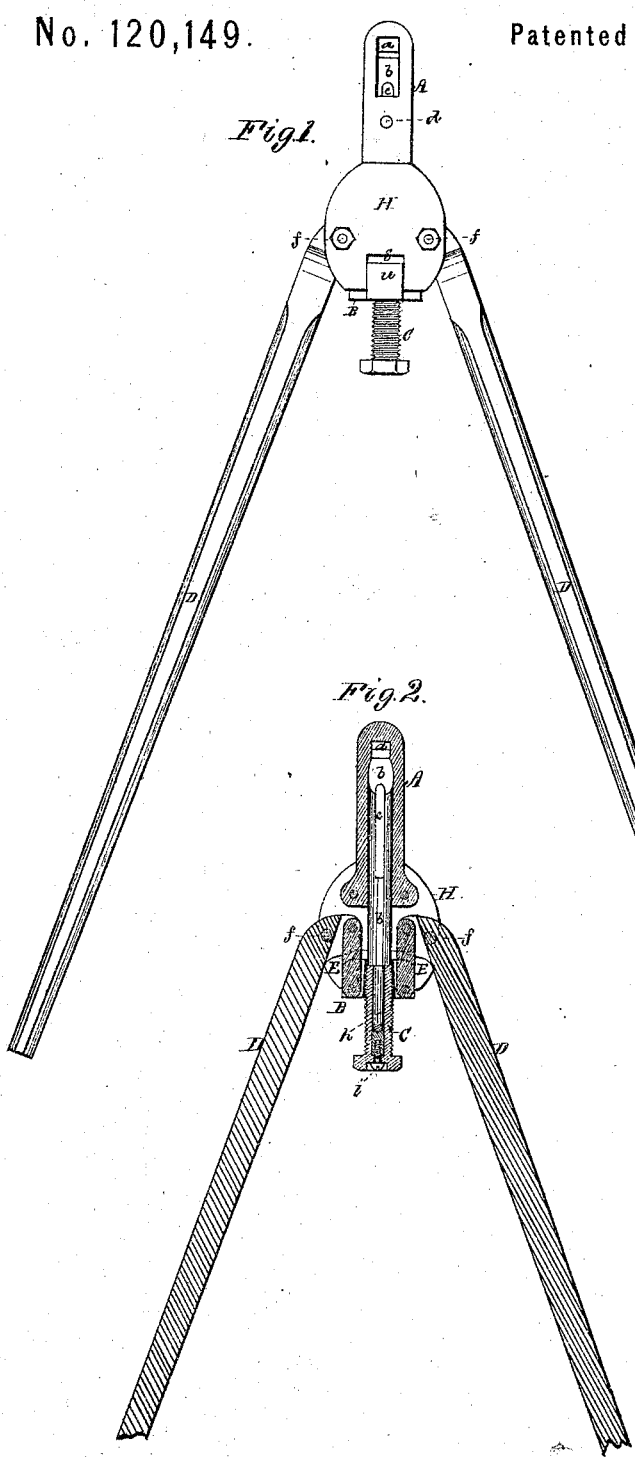
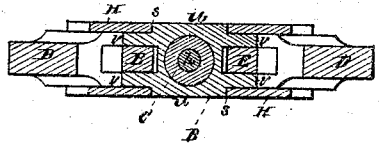
Witnesses.
S. N. Piper
J. R. Snow
J. R. Brown.
by his attorney.
R. Ody

UNITED STATES PATENT OFFICE.

JAMES R. BROWN, OF CAMBRIDGEPORT, MASSACHUSETTS.

IMPROVEMENT IN BOLT-CUTTERS.

Specification forming part of Letters Patent No. 120,149, dated October 24, 1871.

*To all whom it may concern:*

Be it known that I, JAMES R. BROWN, of Cambridgeport, in the county of Middlesex and State of Massachusetts, have made a new and useful invention, having reference to what are termed Bolt-Cutters; and do hereby declare the same to be fully described in the following specification and represented in the accompanying drawing, of which—

Figure 1 is a front elevation of one of my improved bolt-cutters. Fig. 2 is a longitudinal section of it taken through its levers. Fig. 3 is a longitudinal section taken through its cutter and between the levers. Fig. 4 is a transverse section of it taken through the toggles and the movable cutter-carrier.

The bolt-cutter hereinafter described is somewhat analogous to that for which Letters Patent No. 107,438, dated September 20, 1870, were granted to me, and also to that described in an application for a patent filed by me in the Patent Office on October 12, 1870, and allowed on December 24, 1870. Each of the said bolt-cutters last mentioned had its movable cutter-carrier constructed with two racks or series of teeth disposed on opposite sides of it, and engaging with sectoral gears or archal ranges of teeth projecting from two levers pivoted to the stationary cutter-head or plates projecting therefrom. These teeth being liable to become broken by the great strain and wear to which they necessarily are subjected while the implement is in use, I have sought to dispense with them and to employ in their stead other devices, not only of a different character, but operating in a different manner and with far greater effect as well with little or no liability of breakage, comparatively speaking.

In the drawing, A denotes the cutter-head or yoke provided with the stationary cutter $a$ and a movable or sliding chisel, $b$, the latter being socketed into a carrier, B, so as to be capable of being moved endwise therein by means of an adjusting-screw, C, screwed into the carrier, all being arranged in manner as represented. The movable cutter is grooved in its side lengthwise, as seen at $c$, to receive a stud, $d$, projecting from the yoke, the groove and stud serving to prevent the cutter from revolving. From the yoke or cutter-head A two guide-plates, H H, are extended, in manner as shown, either or each of which at its lower part being furcated or slotted, as shown at S, the opposite sides of the slot being parallel. The levers D D are arranged between and pivoted to the two plates, the pivots or fulcrums being shown at $ff$. There are pivoted to the two levers two stirrups, E E, at or near their upper ends, such stirrups, at or near their lower ends, being pivoted to the movable cutter-carrier B, arranged to slide between and against the plates H H, and being provided on one or each side of its two opposite faces with a guide or projection, $u$, to extend into the slot S of the next adjacent plate, the guide being of the same width as the slot. The cutter-carrier also is furnished on each of its other two opposite sides with two lips, $v\ v$, to embrace the stirrup. These lips keep the stirrups steady and prevent them from being bent while they are in operation. The projection $u$ and the slot in which it moves steadies the movable cutter and prevents it from being bent and thereby working with friction in the head. The mode of combining the stirrups with the levers and the cutter-carriers causes the toggles to be subjected to a tensile rather than a pushing strain while the cutter is being advanced. This prevents the stirrups from being bent while in use, they being subjected at times to a very powerful strain.

On taking hold of the levers and moving them apart the cutter-carrier B will be retracted by the stirrups; so, when the levers are moved toward each other, the stirrups will advance the said carrier, the force of propulsion constantly increasing as the advance is made.

From the above it will be seen that the stirrups have one important advantage over toothed racks and sectoral gears, which, while in operation, advance the cutter-carrier equal distances with equal arcs of movement of the levers and with a constant force; whereas with the stirrups such is not the case, as with them during the movements of the levers toward each other the advance of the cutter-carrier constantly decreases and the force of propulsion as constantly increases.

The adjusting-screw C is tubular, and turns on a journal, $h$, formed on the movable cutter-shank, as shown. A screw, $i$, going through the head of the screw C, and being screwed into the journal $h$, serves to hold the screw in engagement with the journal. On revolving the cutter adjusting-screw far enough to unscrew it from the carrier the movable cutter may be drawn out of the carrier for being sharpened or for any other purpose.

I herein make no claim, in a bolt-cutter, to the toothed stock of the movable cutter and toothed segment-levers arranged as shown in the United States Patent No. 65,391; nor do I claim the combination of knives, levers, screws, frame, and top and bottom plates, constructed and arranged in manner and to operate as described in such patent; or in the reissue thereof, dated March 14, 1871; nor do I herein claim the adjusting-screw and the movable cutter $b$ as made and applied together and to the cutter-carrier, as set forth.

What I claim as my invention is as follows:

1. The combination of the levers D D, stirrups E E, and the carrier B, constructed as described, with the plate H, substantially as and for the purpose set forth.

2. In combination with the subject-matter of the above claim, the stationary cutter-head A provided with cutter $a$, the movable cutter $b$, the nut $c$, and holding-screw $b'$, substantially as set forth.

JAMES R. BROWN.

Witnesses:
R. H. EDDY,
J. R. SNOW. (100)